US005454077A

United States Patent [19]

Cheron

[11] Patent Number: 5,454,077

[45] Date of Patent: Sep. 26, 1995

[54] COMMUNICATION SYSTEM BETWEEN A PLURALITY OF TRANSMITTERS AND RECEIVERS HAVING RELAYS RESPONSIVE TO THOSE IDENTIFYING CODES OF TRANSMITTERS CONTAINED IN ITS RESPECTIVE TABLE MEMORY

[75] Inventor: Eric Cheron, Bonneville, France

[73] Assignee: Somfy, Cluses, France

[21] Appl. No.: 679,935

[22] Filed: Apr. 2, 1991

[30] Foreign Application Priority Data

Apr. 17, 1990 [FR] France .................................. 90 04907

[51] Int. Cl.[6] ..................................................... G06F 13/14

[52] U.S. Cl. ............................... 395/200.01; 364/242.94; 364/284.3; 364/284.4; 364/DIG. 1; 364/130; 395/286

[58] Field of Search ..................................... 395/200, 275

[56] References Cited

U.S. PATENT DOCUMENTS

| | | | |
|---|---|---|---|
| 4,002,980 | 1/1977 | Herz | 325/3 |
| 4,135,156 | 1/1979 | Sanders, Jr. et al. | 325/4 |
| 4,181,849 | 1/1980 | Sibley | 307/116 |
| 4,322,768 | 3/1982 | Maeda et al. | 361/64 |
| 4,371,947 | 2/1983 | Fujisawa | 364/900 |
| 4,456,956 | 6/1984 | El-Gohary et al. | 364/200 |
| 4,896,241 | 1/1990 | Li et al. | 361/66 |
| 4,949,299 | 4/1990 | Pickett | 395/200 |
| 5,113,495 | 5/1992 | Uehara | 395/200 |

*Primary Examiner*—Thomas C. Lee
*Assistant Examiner*—Sang Hui Kim
*Attorney, Agent, or Firm*—Laff, Whitesel, Conte & Saret, Ltd.

[57] ABSTRACT

Installation comprising several receiving points and several transmitting points. A control installation especially useful for controlling the operation of roller blinds or shutters. The control installation has several receiving points (4), several transmitting points (1) and the relay points (2) are connected to a common BUS line so as to be able to intercommunicate. The transmitting points (1) are provided in order to transmit signals on the BUS line. Each signal is a frame formed of at least one identifying element and of at least one element defining an order to be executed by the receiver. A particular address code, to which the identifying element corresponds is assigned to each transmitting point. The relay points are equipped with a logic processing unit having memories which are provided in order to store at least one identifying element. The allocating of the address to the transmitter allows the control installation to exhibit very high flexibility.

12 Claims, 9 Drawing Sheets

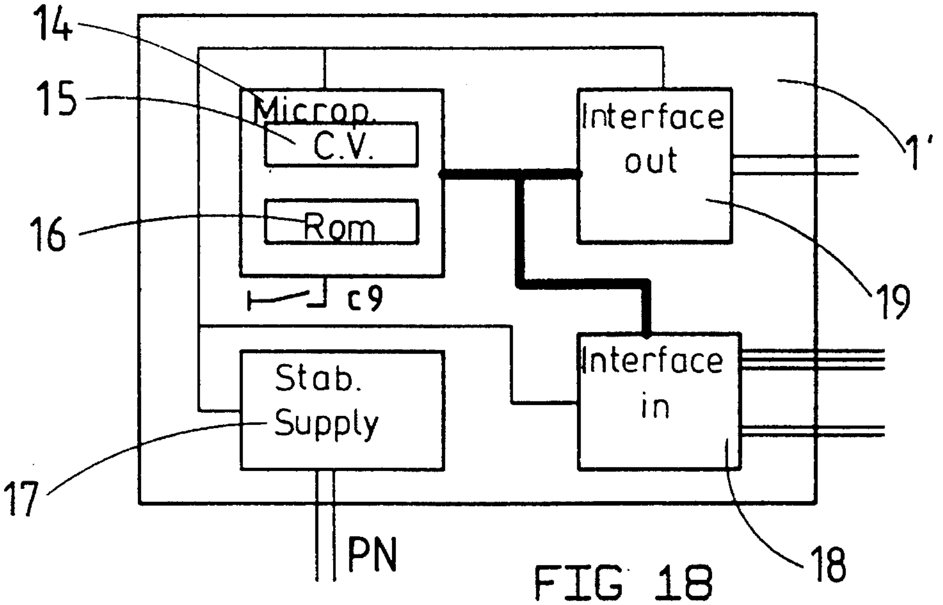
FIG 18
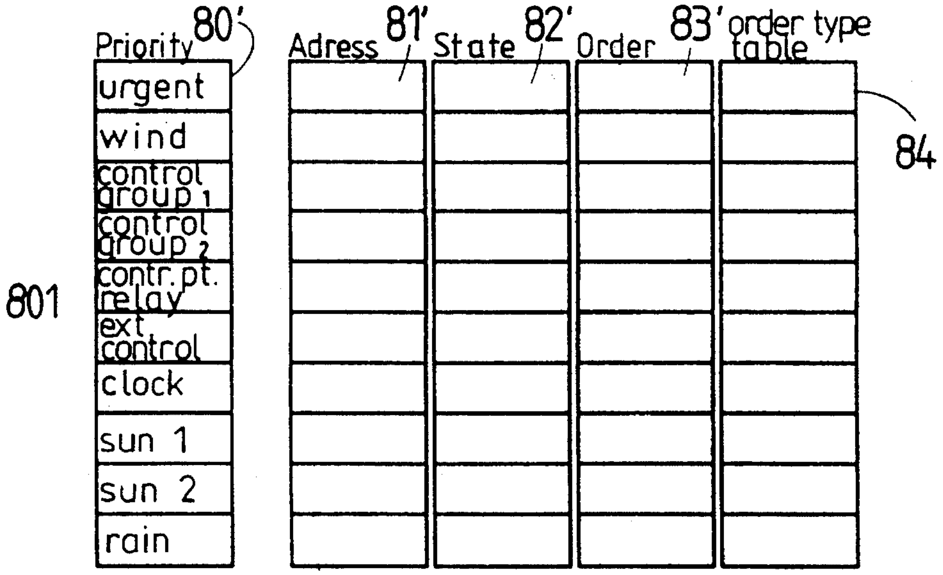
FIG 20
FIG 19
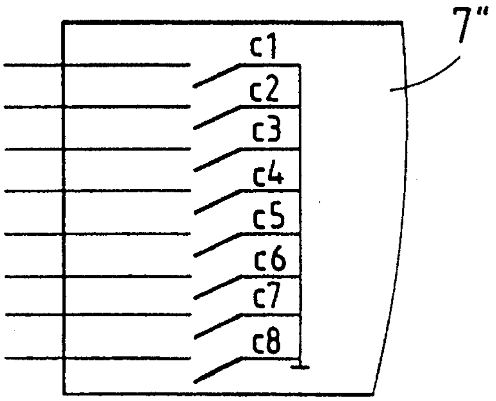

COMMUNICATION SYSTEM BETWEEN A PLURALITY OF TRANSMITTERS AND RECEIVERS HAVING RELAYS RESPONSIVE TO THOSE IDENTIFYING CODES OF TRANSMITTERS CONTAINED IN ITS RESPECTIVE TABLE MEMORY

FIELD OF THE INVENTION

The subject of the invention is an installation comprising several transmitting points, to each of which is assigned a particular address code, and several relay points each connected to a receiving point, the transmitting points and the relay points each being electrically connected to a common BUS line so as to be able to inter-communicate, the transmitting points moreover being provided in order to transmit signals on the BUS line, each signal comprising a frame formed of at least one identifying element corresponding to the address code and of at least one element defining an order to be executed by the receiver, the relay points each comprising means for deciphering and processing the signals transmitted on the BUS line and for activating the receiver which is associated with it, the means provided at each relay point for deciphering and processing the signals and for activating the associated receiver being constituted by a logic processing unit essentially comprising a central processing unit and memories, these memories being provided in particular for storing at least one identifying element.

PRIOR ART

Installations, such as those described in the patent BE 900 816 and, by the name BATIBUS, in the publication MERLIN GERIN of November 1988, are known in which each relay point is assigned a particular address code and the transmitting points transmits a signal the identifying element of which corresponds to the address code of the relay point. The relay point compares its address code with the element for identifying the signals received and, in the event of equality, reacts to the signal message. These installations therefore operate according to the conventional addressing principle, according to which a signal is sent accompanied by the addressee's address.

Now, although highly developed, these installations exhibit significant disadvantages. In fact, it is not possible to make several relay points react to a same signal unless this signal is transmitted as many times as there are relay points to be made to react, each signal comprising a different identifying element corresponding to the address codes of the addressee relay points or unless, as in the BATIBUS installation by MERLIN GERIN, a complicated coding system with several levels is used, allowing families of relay points to be made to react. In this case, the address code of the relay point is composed of a first part defining the family of relay points and a second part defining the relay point in the family. However, despite these possibilities, such an installation remains limited. In particular, it is not possible to make several families of receivers react to a same signal, unless this signal is transmitted as many times as there are families, each time with a matched family code, or an even more complicated coding system is used which provides an additional level allowing groups of families to be made to react. Neither is it possible to include a same relay point in more than one family or more than one group of families. These disadvantages render these installations very inflexible, limiting the possible combinations in the association of the transmitting points and of the relay points. The installations are not very modular, subsequent developments being difficult or even impossible and implying that, for correct optimization of the installation, the latter be set up by a qualified person.

It has been proposed to improve this type of installation by allocating the address to the transmitting station instead of allocating it to the receiving station. Such a method is applied in the installations described in the Patent Applications FR 2 535 133, EP 0 304 023 and EP 0 023 105.

In the installation for digital transmission by bifilar line described in the publication FR 2 535 133, the addresses of the transmitting stations are each stored in a board of the receiving station and each board is connected to a specified actuator or, possibly, to a group of actuators. Each order transmitted by a transmitting station is accompanied by the address of this station and the receiving stations in which this address is stored execute the order received. This installation therefore allows an arbitrary number of receivers to be controlled from a transmitter, it being readily possible to execute modifications at receiver level by a change of board. This installation does not however allow an actuator to be controlled by several transmitters. Now, such a possibility would be useful, or even necessary, in certain applications.

In the installation described in the Patent Application EP 0 304 023, each transmitting/receiving box comprises four inputs and four outputs. Each of the inputs is intended to be connected to a control unit and each of the outputs to a receiver. Each input of each box comprises an address and each output stores a single address. As in the preceding installation, each receiver can receive on the order of only a single control unit.

The Patent Application EP 0 023 105 describes a multiplex transmission installation in which the signals transmitted by the transmitters comprise four bits serving to identify the transmitters. The addresses to which the receiver is to react are stored in a ROM memory of the receiver, but each address corresponds to a particular output intended to be connected to a specified receiver, so that, as in the preceding installations, a receiver can be controlled by only a single transmitter.

SUMMARY OF THE INVENTION

The aim of the present invention is to obviate the disadvantages resulting from the restrictions which the known installations exhibit, that is to say to make it possible to freely and unrestrictedly associate one or more arbitrary transmitting points with one or more arbitrary relay points, to modify the associations, to proceed to any addition of relay points or of transmitting points, at any instant and without engendering any transformation of the initial installation.

To this effect, the installation according to the invention is characterized in that the central processing unit and the memories of the logic processing unit of each relay point constitute a microprocessor comprising a non-volatile central programmed memory and a volatile central data memory, the central program memory containing a main configuring and application program itself comprising a frame reception subroutine, and subroutines for executing the orders, the main program being provided, on the one hand, in order to select the signals traveling on the BUS line of which the identifying element corresponds to the stored signal, with respect to one of the stored signals, and on the other hand, in order to activate, for each signal selected, the subroutine for executing the order contained in its frame and transmit it to the corresponding receiver.

The installation according to the invention not only allows the set aims to be attained, but it furthermore allows easy implementation by an unqualified operative, in particular by the user.

In certain forms of execution, it furthermore makes it possible to manage the priorities in the execution of the orders contained in the signals originating from various transmitting points, acting simultaneously, the priorities being able to be, according to the forms, predefined, defined by the user, or both, as well as to execute the orders transmitted directly by the relay point, in the case where it is desired to have available individual control in addition to centralized control.

BRIEF DESCRIPTION OF THE DRAWINGS

Modes of execution will now be described, by way of example, with reference to the attached drawing, in which:

FIG. 18 represents a modified transmitting point, according to a sixth embodiment;

FIG. 19 diagrammatically represents the interface of a relay point of this sixth embodiment;

FIG. 20 represents the tables of priorities, of addresses, of states of transmitters, of orders and of types of orders in the central data memory at the relay point in the sixth embodiment.

DESCRIPTION OF THE PREFERRED EMBODIMENTS

Figure 1:
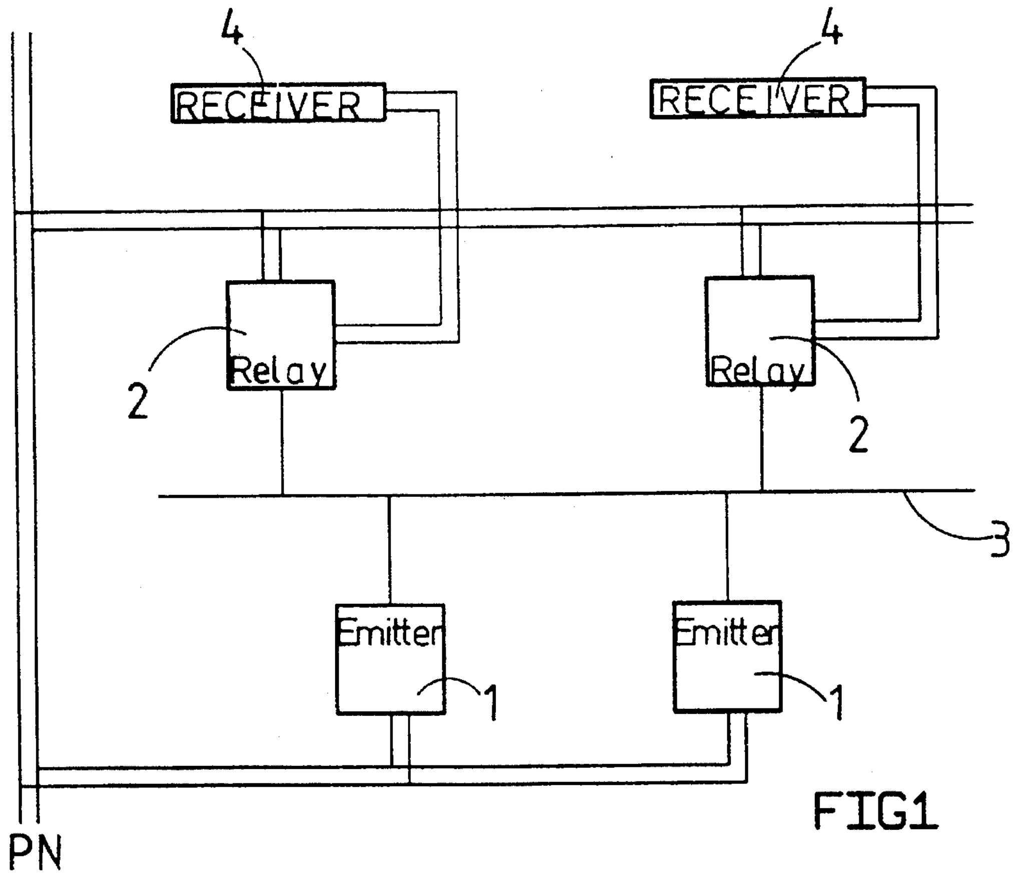
FIG. 1 represents the overall diagram of the installation.

The diagram represented in FIG. 1 is valid for all the embodiments. The installation, as represented in part in FIG. 1, comprises several transmitting points 1, several relay points 2, a BUS 3 to which all the transmitting points 1 and all the relay points 2 are connected, receiving points 4 respectively associated with each of the relay points 2 and a bifilar power supply P/N connected to the mains power supply in order to power the transmitting, relay and receiving points. In the example under consideration the receiving points 4 are phase-shift capacitor electric induction motors able to rotate in two directions, in order for example to equip geared motors intended to wind or unwind a windable element between two positions, such as roller blinds or shutters. These geared motors comprise devices for automatically arresting the windable element when the latter arrives at each of its two end positions.

Figure 2:
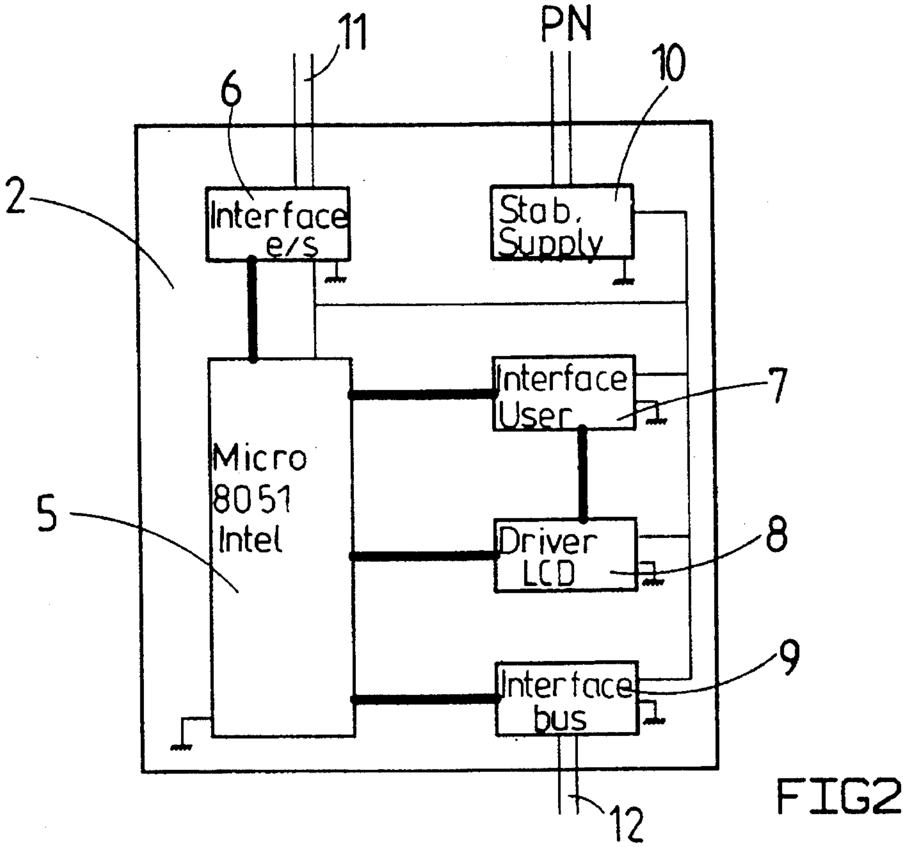
FIG. 2 represents the configurational diagram of a relay point.

The relay point, the diagram of which is represented in FIG. 2, comprises a microprocessor 5 (for example a Micro 8051 Intel microprocessor), a receiver I/O (input/output) interface 6, a user interface 7, an LCD driver 8, a BUS interface 9, a stabilized power supply 10, the bifilar P/N connection connected to the mains power supply, a bifilar connection 11 connected to the receiver and a bifilar connection 12 connected to the BUS line.

The interconnections between the various elements are constructed according to FIG. 2.

Figure 4:
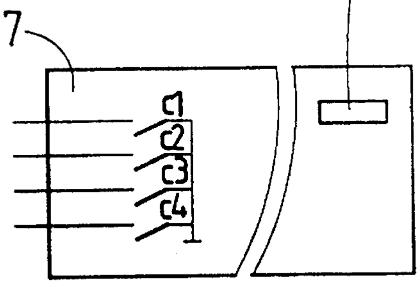
FIG. 4 diagrammatically represents the input interface of a relay point such as that used in the first, second, fourth and fifth embodiments and the display of the first embodiment.

The stabilized power supply 10 is provided in order to furnish a very low-voltage power supply to the microprocessor 5, to the interfaces 6 and 7 and to the LCD driver 8. The receiver I/O interface 6 is provided in order to furnish the power to the geared motor in response to the orders issued by the microprocessor 5. The BUS interface 9 is provided in order to match the impedence of the BUS 9 to that of the microprocessor 5. The LCD driver 8 is provided in order to activate the liquid crystals of an LCD display 13 contained in the user interface 7 diagrammatically represented in FIG. 4. This interface comprises four contacts C1, C2, C3 and C4. The contact C1 is a two-position contact allowing selection of the operating mode of the relay point (configuration programming mode or application mode). The contact C4 is a pulse-action contact enabling, in programming mode, the incrementing of the position of the pointer in the address table. The contacts C2 and C3 are pulse-action contacts enabling, in programming mode, the incrementing/decrementing of the address of the pointed at slot of the address table. The display 13 is an LCD display with three digits having eight segments. It is intended to enable, in programming mode, the visualizing of the incrementation/decrementation of the address in response to the actuating of the contacts C2 and C3.

Figure 3:
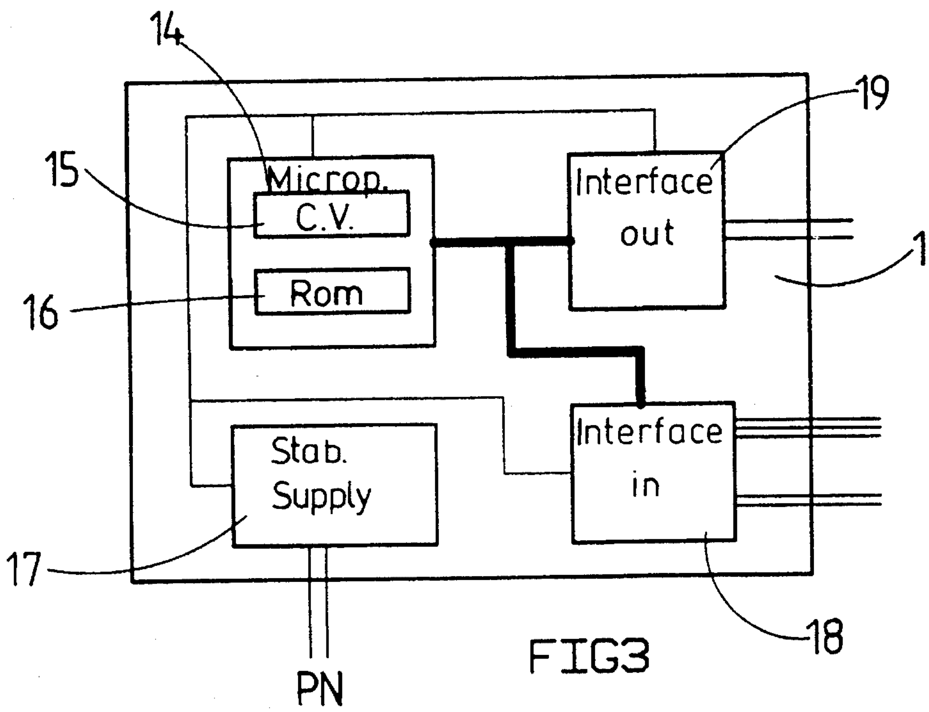
FIG. 3 represents the configurational diagram of a transmitting point.

The transmitting point, diagrammatically represented in FIG. 3, comprises a microprocessor 14 essentially consisting of a central processing unit 15 and of a non-volatile memory 16, a stabilized power supply 17, an Input interface 18 and an Output interface 19. The stabilized power supply 17 is provided in order to afford a very low-voltage power supply to the components of the transmitting point. It is connected on the one hand to these components and on the other hand to the mains. The Output interface 19 is connected to the BUS line 3 and the Input interface 18 is connected, depending on the type of transmitter, to two or three contacts actuated directly or indirectly, depending on the type of transmitter, by sensors (transmitter, wind, sun, rain, etc.), automatic devices (clock) or the user (group control, urgent). The interfaces 18 and 19 are provided in order to match the impedence of the microprocessor 14 to the BUS line and to the contacts.

The non-volatile memory 16 comprises an address code and a program provided in order to transmit on the Output interface each time that a contact is activated on the Input interface, a signal comprising a frame in which the address code is incorporated, as well as an order corresponding to the actuated contact and to the type of transmitter. In the example under consideration, the types of transmitters are as follows: URGENT, WIND, GROUP CONTROL, EXTERIOR, CLOCK, SUN, RAIN.

A WIND transmitter will have two contacts on the Input interface, one activated when the sensor records a wind speed greater than a certain threshold, the other actuated when the speed of the wind crosses back under this threshold. To the first actuated contact, the transmitting point will deliver in its frame an Up order, and to the second a halt of the Up order.

The URGENT, EXTERIOR, CLOCK, SUN and RAIN transmitting points will similarly have two contacts. To each of these contacts the transmitting point will deliver in its frame the following order:

For the URGENT type, for example exterior control connected with a feeler bar of a roller blind, a Stop order, a Halt order;

for the CLOCK type, an Up order, a Down order, or vice versa;

for the SUN type, a Down order, a Halt order;

for the RAIN type, an Up order, a Halt order.

The GROUP CONTROL transmitting points will have three contacts to which correspond Up, Down and Stop orders and, for each of these latter respectively, a Halt order.

Figure 13:
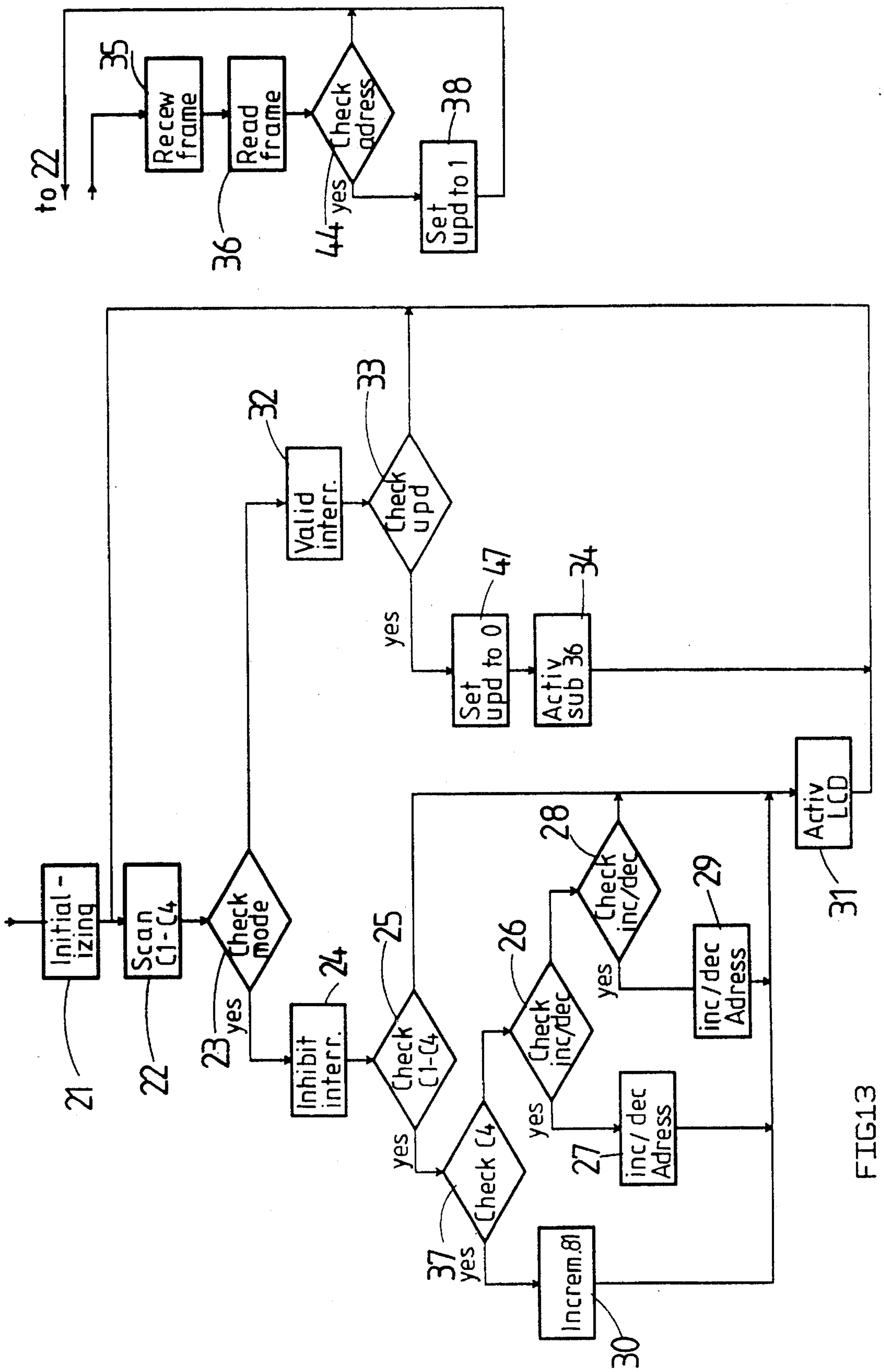
FIG. 13 represents the flow diagram of the first embodiment.

The microprocessor 5 of each relay point 2 essentially comprises, in a known manner, a central processing unit, a non-volatile, central PRG (programming) memory, and a volatile, central data memory. The central PRG memory comprises the subroutines for activating and transmitting the Up, Down and Stop orders and the main configuring and application program which itself comprises a frame reception subroutine. The flow diagram of the main program and of the reception subroutine is represented in FIG. 13. The instructions appearing in this flow diagram are as follows:

21 is an initializing instruction,

22 is an instruction for scanning the various contacts of the user interface 7,

23 is an instruction for checking the selected mode (configuration/application programming),

24 is an instruction for inhibiting outside interruption,

25 is an instruction for checking that at least one of the contacts C1 to C4 of the user interface is activated,

26 and 28 are instructions for checking that the contacts for incrementing/decrementing the user interface are activated,

27 and 29 are instructions for incrementing/decrementing the address in the pointed at memory slot of the address table,

30 is an instruction for incrementing the pointer of the address table,

31 is an instruction for activating the LCD driver,

32 is an instruction for validating outside interruption,

33 is an instruction for checking the 1 or 0 state of the update (UPD) indicator,

34 is an instruction for activating the subroutine for executing the order stored by 36,

35 is an instruction for receiving the frame,

36 is an instruction for reading and for storing the address of the order contained in the frame,

37 is an instruction for checking that the contact C4 is activated,

38 is an instruction for setting the update UPG indicator to 1,

44 is an instruction for checking that the address stored by 36 corresponds to that of the one stored in PRG mode,

47 is an instruction for setting the update UPD indicator to 0.

Instruction 32 authorizes a jump of the main program to the frame reception subroutine once a transmitter signal is traveling on the BUS line.

Instruction 24 inhibits the authorization produced by instruction 32.

The central data memory comprises an address table consisting of memory slots (FIG. 5) intended to store the addresses of the transmitters to which the relay point is to be responsive, frame memory slots intended to temporarily store the information contained in the frame of the last signal traveling on the BUS line and an indicator consisting of a memory slot is intended to receive a 1 each time that the address of the stored frame corresponds to that of the one stored in the address table.

Operation

On powering-up, the installation is initialized by instruction 21. In particular, the volatile memories are reset to 0. No contact C1 to C4 of the user interfaces 7 of the relay points 2 is actuated and no signal is traveling on the BUS line.

The configuring of the installation, that is to say the programming of each relay point 2, is firstly proceeded with. The main program executes as represented by the flow diagram of FIG. 13. Instruction 22 scans the contacts C1 to C4 of the user interface 7 of the relay point 2 under consideration. Instruction 23, which checks the position of the contact C1, calls instruction 24 which inhibits outside interruption. From this instant onwards, the LPU of the relay point remains unresponsive to any signal able to travel on the BUS line 3. Instruction 37 checks that the contact C4 is not activated, and if this is indeed the case, it calls instruction 26 which checks that the contact C2 is activated. If TRUE, instruction 27 increments the address of the memory slot pointed to in the address table (FIG. 5), then instruction 31 activates the LCD driver 8 which controls the crystals of the LCD display 13 and enables the displaying of the address. The program loops. As long as there is no change and as long as the contact C2 is activated, the address of the memory slot pointed to increments. When the address corresponds to that of the transmitter to be programmed, the contact C2 is released. If the address has been overshot, it suffices to actuate the contact C3. At this instant, instruction 26 checks that the contact C2 is no longer activated and instruction 28 checks that the contact C3 is activated. Instruction 29 decrements the address of the memory slot pointed to.

Figure 5:
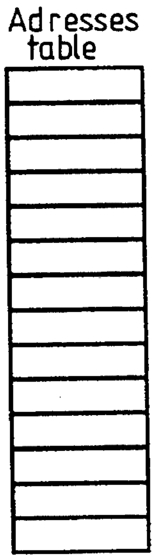
FIG. 5 diagrammatically represents the table of addresses which are contained in the central memory of the logic processing unit of a relay point in the first embodiment.

In order to program the address of another transmitter, it suffices to activate the contact C4 of the user interface 7. Instructions 21, 22, 23, 24 and 25 execute as previously, instruction 37 checks that the contact C4 is activated and instruction 30 increments the pointer of the address table which is moved to the next memory slot (FIG. 5). The address of the transmitter 1 is then stored in the same way as previously by acting on the contacts C2 and C3.

Application

The main program executes according to the flow diagram of FIG. 13. Instructions 21 and 22 execute as previously. The contact C1 is placed in application mode. Instruction 23, which checks the position of the contact C1, calls instruction 32 which validates outside interruption. From this moment onwards, any signal traveling on the BUS line 3 triggers the reception subroutine: instruction 35 takes delivery of the signal frame, instruction 36 stores the address and the order contained in the frame, instruction 44 checks that the stored address corresponds to one of those stored in PRG mode and calls instruction 38 which writes a 1 in the update (UPD) indicator, then the reception subroutine returns to the main program. Instruction 33 checks that the update indicator is at 1, calls instruction 47 which resets the indicator to 0, then instruction 34 calls the subroutine for activating the order corresponding to that stored by instruction 36.

In the case where instruction 44 verifies that the address stored by instruction 36 does not correspond to that of the one stored in PRG mode, the subroutine returns to the main program and instruction 33, which then checks that the update indicator is at 0, loops back to the main program, awaiting a new signal.

Each relay point 2 is programmed in this way. The relay points can store an address of different transmitting points and it is possible, at any moment, to add or remove a transmitting point address in the relay point. For this purpose, it suffices to proceed as described previously, by successively acting on the contact C1 in order to place the device in program mode, on the contact C4 in order to move the pointer of the address table onto a new memory slot or onto the slot containing the address of the transmitter to be removed and on the contacts C2/C3 in order to increment/decrement the new address or an inactive address.

A second embodiment will now be described with the aid of FIGS. 6, 7, 8 and 14.

In this second embodiment, each transmitting point 1 comprises, in its non-volatile memory 16, an additional code specific to the type of transmitter. In the example under consideration where the receivers are shutters, the following types of transmitters are distinguished: URGENT, WIND, GROUP, EXTERIOR, CLOCK, SUN, RAIN. Each of the transmitting points 1 is moreover provided in order to incorporate its code in the frame of the signal transmitted on the BUS 3.

Figure 7:
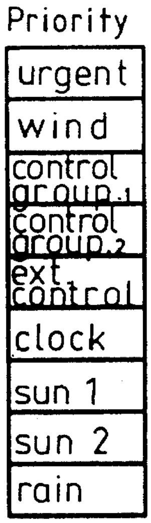
FIG. 7 represents a table of priorities which is present in the central memory of the LPU of the relay points in the second embodiment.
Figure 8:
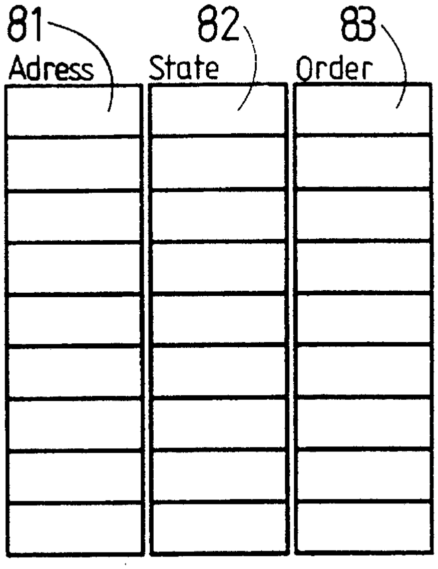
FIG. 8 diagrammatically represents the tables of addresses, of states of transmitters and of orders of the central data memories which are present at the relay points, in the second embodiment.

Each relay point 2 comprises in its central PRG memory a priority table consisting of several memory slots (FIG. 7). The type code of a transmitting point 1 is stored, according to a particular order, in each of the memory slots. In the example under consideration, one memory slot is provided for each of the URGENT, WIND, EXTERIOR, CLOCK and RAIN types and two slots are provided for the GROUP and SUN types. The order of priority is URGENT, WIND, GROUP, EXTERIOR, CLOCK, SUN, RAIN.

In its central data memory, each relay point 2 comprises three tables 81, 82, 83 (FIG. 8) each consisting of an identical number of memory slots, each being associated with a memory slot of the priority table (FIG. 7). Table 81 is an address table whose function is to store, as in the first embodiment, the addresses of the transmitting points to which the relay point is to be responsive. Table 82 is a transmitter state table whose function is to store the active or inactive state of the transmitting points. An active state will be stored for the "Up, Down and Stop" orders and an inactive state for a "Halt order" order. Table 83 is an order table whose function is to store the nature of the last order of each transmitting point.

Figure 6:
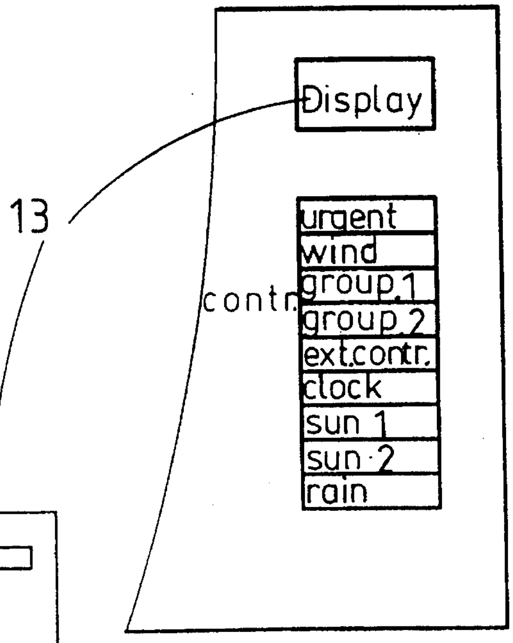
FIG. 6 represents a display present at the relay point in the second embodiment.

The LCD display 13 of the user interface 7 comprises, in addition to the three digits having eight segments, segments or LEDs each corresponding to a transmitting point, as illustrated by the slots of FIG. 6. In the example under consideration these segments or LEDs are nine in number, their function being to visualize the memory slot pointed to in the priority table (FIG. 7). The pulse-action contact C4 of the user interface 7 increments the position of the pointer of the priority table.

Figure 14:
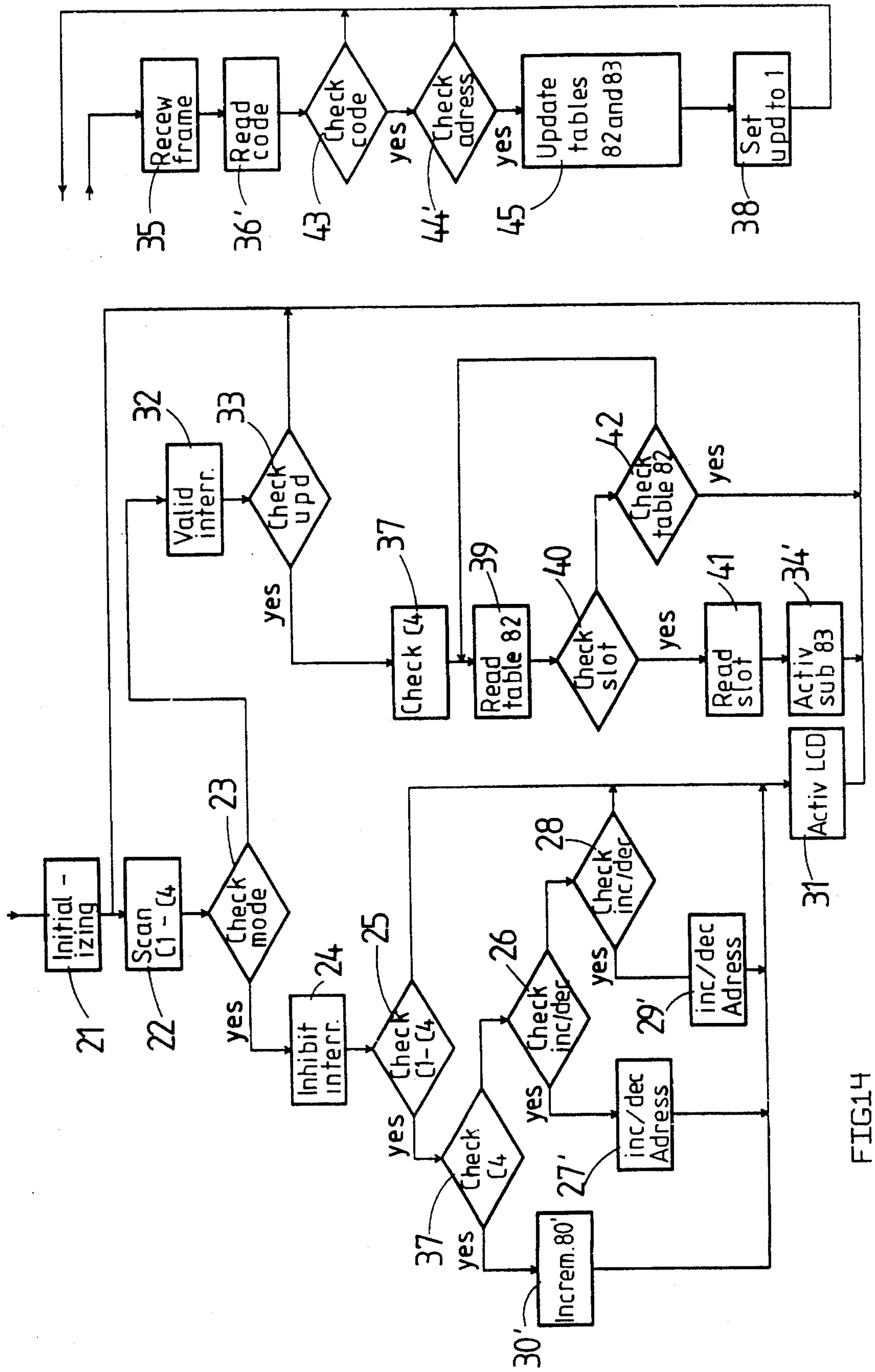
FIG. 14 represents the flow diagram of the second embodiment.

The main program and the reception subroutine comprise with respect to the flow diagram of FIG. 13, the additional instructions appearing in the flow diagram of FIG. 14. Furthermore, instruction 36 is replaced by instruction 36' which reads and furthermore stores the code for the type of transmitter contained in the frame. The new instruction 43 is an instruction for checking that the received transmitting type code for the frame corresponds to a type stored in the priority table. Instruction 44 is replaced by instruction 44' which checks that the address of the received frame in relation to the type checked previously corresponds to that of the one stored in the address table. Instruction 45 is an instruction for updating the slots of the state table 82 and of the order table 83 corresponding to the type and to the address which are contained in the frame stored at 36'. This instruction places a 1 or a 0 in the slot of the state table 82 according as the corresponding order is active or inactive and carries over the order itself into the slot of the order table 83. 39 is an instruction for reading a slot of the state table 82 according to the order of the priority table. 40 is an instruction for checking the state of the slot read by the preceding instruction. 41 is an instruction for reading the slot of the order table 83 corresponding to the slot checked by instruction 40. 42 is an instruction for checking the position of the pointer at the end of the state table. Instructions 27, 29, 30 are replaced by instructions 27', 29', 30'. Instructions 27' and 29' are instructions for incrementing and for decrementing the address of the memory slot corresponding to the slot pointed to in the priority table. Instruction30' is an instruction for incrementing the pointer of the priority table. Instruction 34 is replaced by instruction 34' which is an instruction for activating the subroutine for executing the order stored in the order table 83 corresponding to the slot checked by instruction 40.

The configuring of the installation is carried out as follows: the contact C1 of the user interface 7 is placed in program mode and instructions 21, 22, 23, 24, 25 of the main PRG execute as in the first embodiment. The contact C4 is activated and instruction 30' increments the pointer of the priority table. Instruction 31 activates the LCD display which allows the position of the pointer to be visualized. The contact C4 is activated until the pointer is on the slot of the transmitter type to be programmed. As for the preceding embodiment, the address of the transmitting point is stored by means of the contacts C2 and C3 and the instructions 26, 27', 28 and 29'. In the example under consideration, each relay point 2 allows the storing of one address for each of the URGENT, WIND, EXTERIOR, CLOCK and RAIN transmitter types and two addresses for the GROUPS and SUN types.

The contact C1 (FIG. 4) being placed in application mode, if a signal is traveling on the BUS line 3, instructions 21, 22, 23, 32, 35, 36' execute as in the preceding mode. Instructions 43, 44' successively check that the type and the transmitter address which are contained in the frame and are stored at 36' correspond to those previously stored, then instruction 45 proceeds to update the transmitter state table 82 and the order table 83 by carrying over in the table 82, in the slot corresponding to the transmitter concerned, a 1 if the order corresponds to one of the Up/Down/Stop orders, or a 0 in the contrary case and, in the table 83, in the slot corresponding to the transmitter concerned, the nature of the order.

Instructions 38, 33, 37 execute as in the preceding mode, then instruction 39 activates the reading, according to the order of the priority table, of the first slot of the transmitter state table 82. Instruction 40 checks that the memory slot read at 39 is equal to 1 then instruction 41 reads the corresponding slot of the order table 83. The program executes thereafter as in the preceding mode and transmits the order to the receiver 4.

If one of the checks 43 and 44' is FALSE, the reception subroutine loops to the main program, no updating is carried out and the update indicator remains at 0. Instruction 33 loops to instruction 22 without transmitting any order to the receiver 4.

If instruction 40 verifies that the state of the slot read by instruction 39 is equal to 0 (the case of an inactive transmitter), instruction 42 checks that the pointer is at the end of the table, then loops to instruction 22 and no order is transmitted to the receiver 4.

In the case where instruction 42 verifies that the pointer is not at the end of the table, the program loops to instruction 39 which reads the next slot of the state table 82, according to the order of the priority table, then the program executes as described previously.

It will be noted that the pointer of the priority table can access the next slot only if the slot of the corresponding state table 82 is equal to 0. Under these conditions, in the case of a plurality of simultaneously active transmitting points, the corresponding orders will be executed according to the order of the priority table (FIG. 7) and the order of the next active transmitting point will be executable only if the current transmitting point becomes inactive. The order of a transmitting point which successively becomes active, then inactive while a transmitting point which precedes in the priority table is active, will never be executed.

Figure 10:
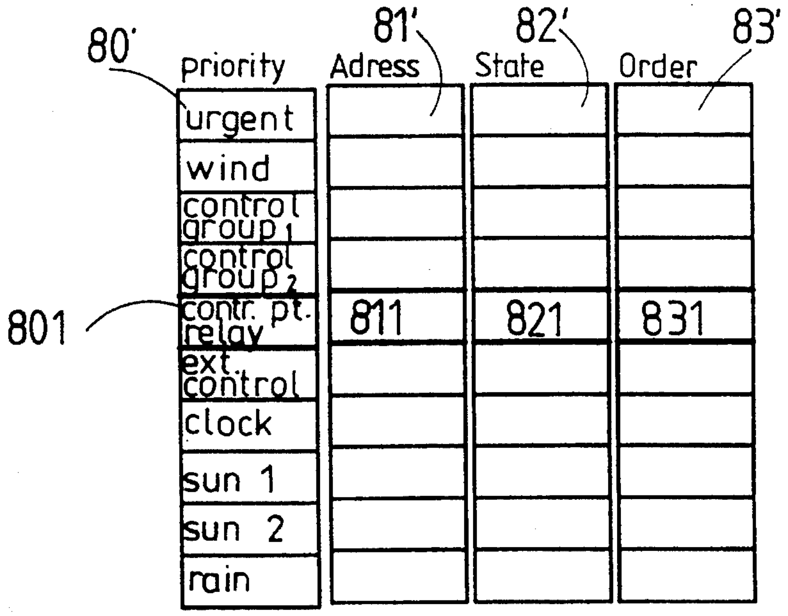
FIG. 10 diagrammatically represents the table of priorities and the tables of addresses, of states of transmitters and of orders which are present at the relay points in the third embodiment.
Figure 9:
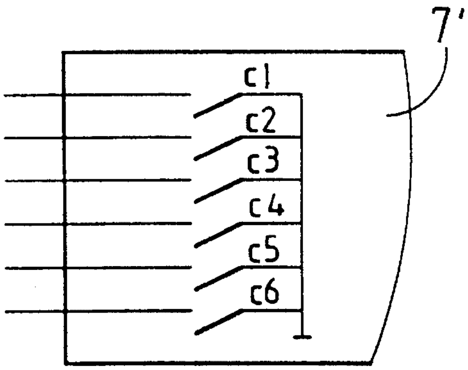
FIG. 9 diagrammatically represents the interface, used in the third embodiment, of a relay point.

A third embodiment will be described with the aid of FIGS. 9, 10 and 15.

In this embodiment the user interface 7' (FIG. 9) of each relay point 2 comprises three additional contacts C5, C6, C7 corresponding to the "Up, Down and Stop/Halt" orders. The priority table 80' (FIG. 10) comprises a "relay point" additional memory slot 801. In the example under consideration, this slot 801 is situated after the "Group control" memory slots. This memory slot 801 stores the reference code of the relay point. In each of the address 81', transmitter state 82' and order 83' tables there is provided an additional memory slot 811, 821 and 831 respectively, associated with slot 801 of the priority table. Slots 821 and 831 are intended to store respectively the active/inactive state and the order of the relay point.

Figure 15:
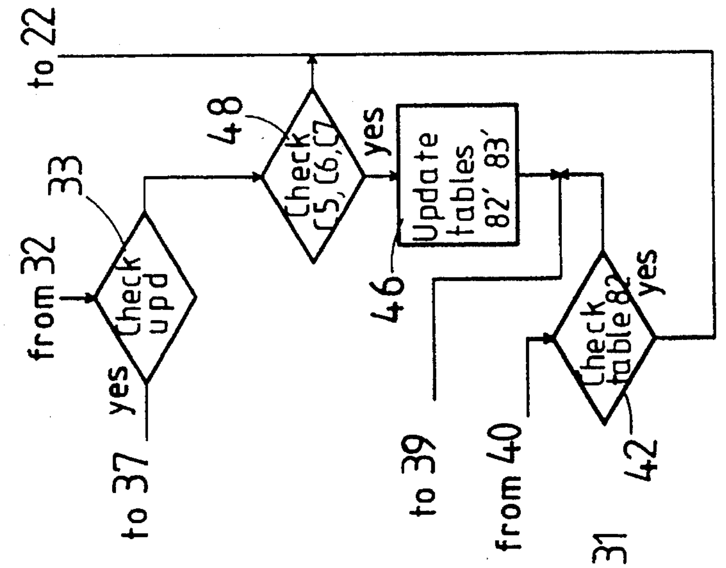
FIG. 15 represents the modification made to the flow diagram of FIG. 14 in the third embodiment.

The main program comprises the additional instructions 46 and 48 represented in FIG. 15 with the neighboring instructions. For the remainder, the flow diagram is identical to the flow diagram of FIG. 14. The frame reception subroutine is unchanged.

Instruction 48 is an instruction for checking that the contacts C5, C6, C7 of the user interface 7' are active or not. 46 is an instruction for updating the corresponding slot of the state table 82' and of the order table 83'.

The operation of this third embodiment is as follows: the configuring of the installation is carried out in the same way as in the preceding embodiment.

The application mode differs from the preceding mode at the termination of instruction 33. When instruction 33 verifies that the update indicator is at 0, it calls instruction 48 which checks the state of the contacts C5, C6, C7 of the user interface 7' of the relay point. If no activation is detected, the program loops back to instruction 22. If on the other hand one of the contacts C5, C6, C7 is activated, instruction 46 proceeds to update the corresponding memory slots of the state table 82' and of the order table 83'. Then, as in the preceding embodiment, instructions 39, 40, 42 execute until instruction 40 checks for a slot equal to 1 in the state table 82'. In the absence of other active transmitters, situated higher up the priority table 80', instruction 40 checks for the state equal to 1 of the slot corresponding to the relay point concerned, then instructions 41 and 34' execute as previously. The order is activated.

If at the same time, a transmitter of type situated higher up the priority table 80' is active, the order of the relay point will not be executed as long as this transmitter remains active, in accordance with the same diagram as in the preceding embodiment.

This embodiment enables control of the receivers 4 linked to a relay point 2 directly from the latter, whilst yet complying with the priorities.

A fourth embodiment will now be described with the aid of FIGS. 11 and 16.

Figure 11:
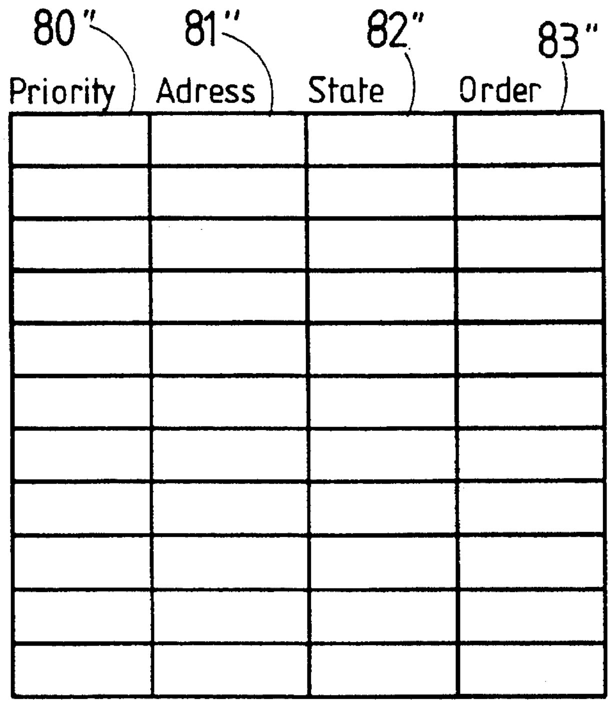
FIG. 11 diagrammatically represents the tables of priorities, of addresses, of states of transmitters and of orders figuring in the central data memory at the relay points in the fourth embodiment.

In this mode of application, the priority table is not disposed in the central program memory, but in the central data memory, as is illustrated in FIG. 11 where the tables 80", 81", 82" and 83" are respectively the priority, address, transmitter state and order table. The priority table 80" consists of an identical number of memory slots to the number of slots present in the preceding embodiment, each of these slots being associated with a slot of the address, state, and order tables. These slots are intended to store the transmitter type code. The contact C4 of the user interface 7' is provided in PRG (program) mode in order, in addition, to move the pointer from the pointed at slot of the priority table 80" to the corresponding slot of the address table 81".

The three-digit window of the LCD display is provided, in addition, in order to display the transmitter type code when the pointer is in the priority table.

The contacts C2 and C3 of the user interface 7' are provided in addition in order to increment/decrement the transmitter type code when the pointer is in the priority table.

The central data memory comprises a type indicator consisting of an additional memory slot intended to receive 0 or 1.

Figure 16:
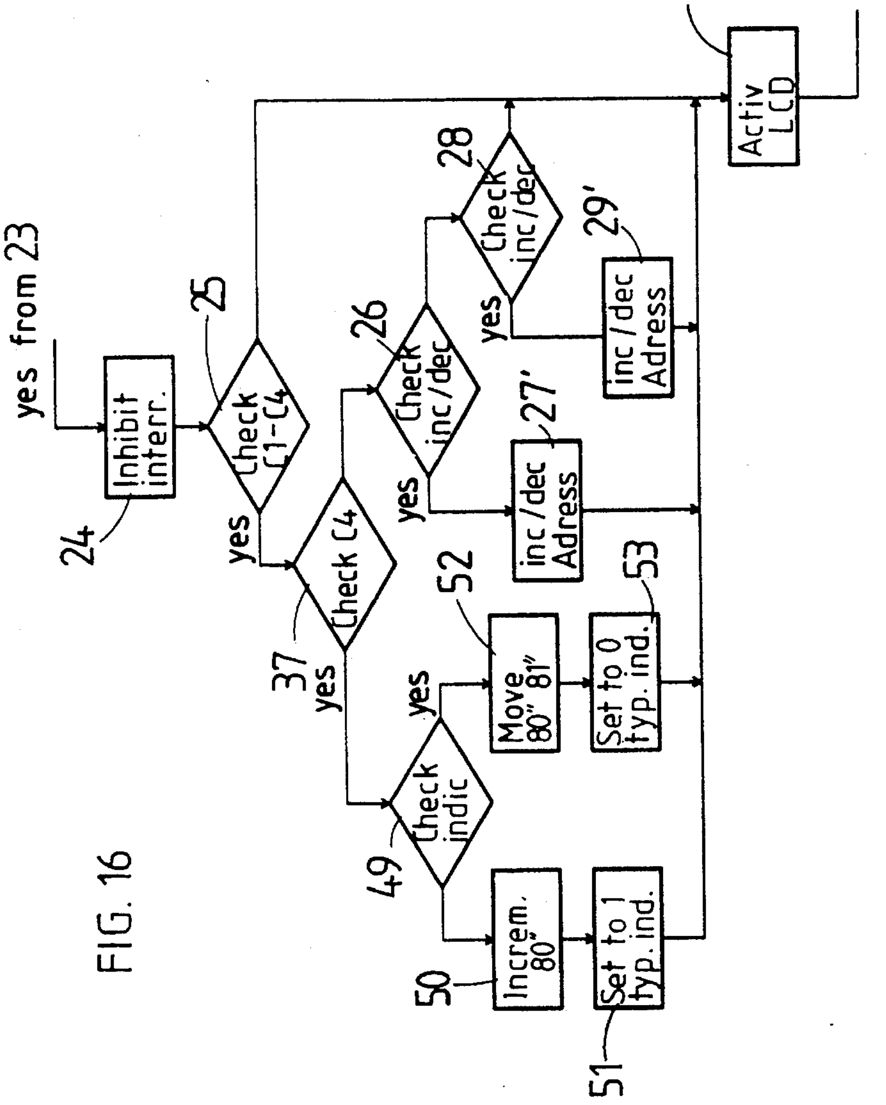
FIG. 16 represents an additional modification made to the flow diagram of FIG. 14 in the fourth embodiment.

The main program comprises a certain number of additional instructions appearing in the flow diagram extract represented in FIG. 16. The remainder of the flow diagram is identical to that of FIG. 15.

Instruction 49 is an instruction for checking the state of the type indicator. 50 is an instruction for incrementing the priority table 80". 51 is an instruction for setting the type indicator to the 1 state. 52 is an instruction for moving the pointer from the priority table 80" to the address table 81" to the slot corresponding to that previously pointed to in the priority table. 53 is an instruction for setting the type indicator to the 0 state. The program is moreover provided in order to initialize to 0 the type indicator when the selector C1 switches to PRG mode.

The configuring of the installation according to this fourth embodiment is carried out in the following way: the contact C1 of the user interface is switched to PRG mode. The type indicator is initialized to 0. The user activates the selector C4. Instructions 22, 23, 24, 25, 37 execute as in the preceding embodiments, then instruction 49 checks that the type indicator is at 0, instruction 50 increments the priority table and instruction 51 sets the type indicator to 1. The program loops back, executing as described previously.

With the pointer being, for example, on the first slot of the priority table 80", the user then activates the contacts C2/C3. Instruction 37 checks that the selector C4 is no longer activated and successively calls instructions 26/28, 27'/29' which increment/decrement the type code, which code is displayed on the LCD display, by instruction 31. Then the program loops back.

The user activates the selector C4 a second time, instruction 49 checks that the type indicator is at 1 and calls instruction 52 which moves the pointer from the slot of the priority table to the corresponding slot of the address table 81". Instruction 53 resets the type indicator to 0 and the program loops back.

With the pointer being on the corresponding slot of the address table 81", the user activates the contacts C2/C3 a second time and, as described previously, instruction 37 successively activates instructions 26/28, 27'/29' which increment/decrement the address code, which is displayed on the LCD display by instruction 31.

Repetition of the preceding operations allows a transmitter type code to be stored in each slot of the priority table 80" and an address code in each corresponding slot of the address table 81".

In application mode, the orders of the simultaneous transmitters are executed according to the hierarchy of the priority table, that is to say according to the hierarchy defined by the user. Execution is performed according to the same diagram as in the preceding embodiments.

This embodiment exhibits the advantage of enabling the user to define at his convenience the hierarchy for executing the orders of the simultaneously active transmitters.

Figure 12:
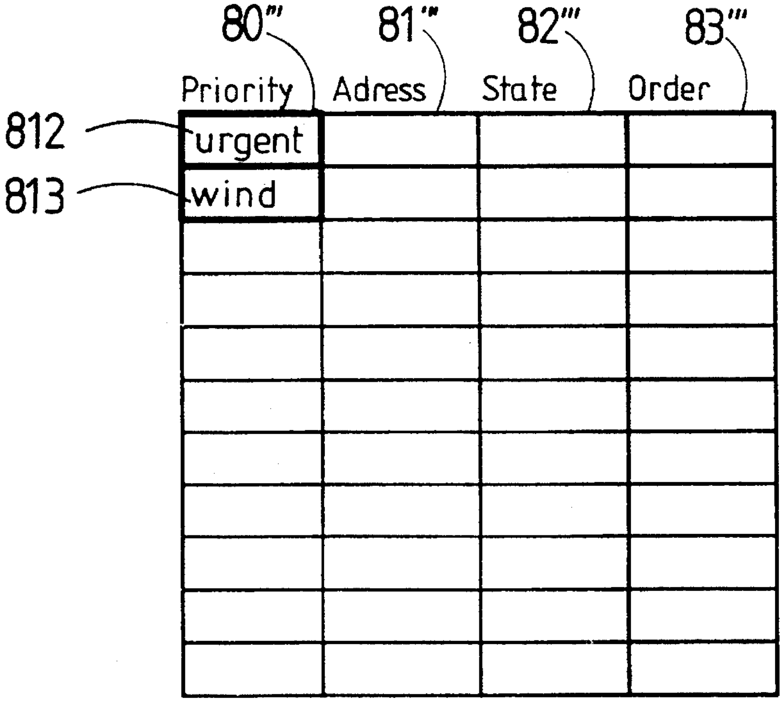
FIG. 12 represents the same tables in which two memory slots of the table of priorities are protected.

A fifth embodiment will now be described with the aid of FIGS. 12 and 17.

In this embodiment, part of the priority table 80'" (FIG. 12) consists of protected memory slots containing a preprogrammed type code. In the case in hand they are the first two memory slots 812 and 813. With respect to the flow diagram represented in FIG. 16, the main program comprises an additional instruction 54 (FIG. 17) which is an instruction for checking that the memory slot pointed to in the priority table is protected.

Figure 17:
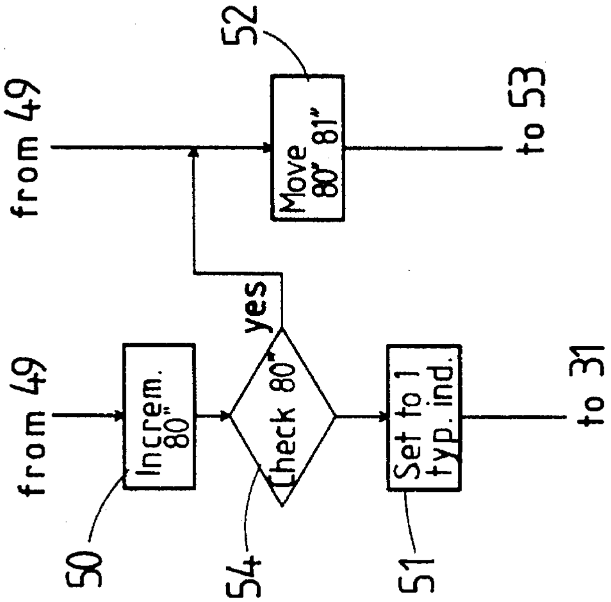
FIG. 17 represents an additional modification made to the modification represented in FIG. 16, in the fifth embodiment.

So as not to needlessly reproduce the whole flow diagram of FIG. 16, FIG. 17 shows only the additional instruction 54 and the neighboring instructions.

With the contact C1 of the user interface 7' being switched to PRG mode, the configuring of the installation differs from the preceding embodiment at the termination of instruction 50. With the pointer being located on a slot of the priority table 80'", instruction 54 checks that this slot is protected. If this is the case, it calls instruction 52 which moves the pointer to the corresponding slot of the address table 81'". If the slot pointed to is not a protected slot, instruction 54 calls instruction 51 which sets the type indicator to 1 and the program loops back as described in the first embodiment.

In application mode, operation is the same as in the fourth embodiment.

The orders of the simultaneously active transmitters are executed according to the hierarchy of the priority table, that is to say according to a compromise between a predefined hierarchy and a hierarchy defined by the user.

This fifth embodiment exhibits the advantage of allowing a priority to be imposed on the execution of the orders of certain types of transmitters like those transmitting safety orders such as URGENT and WIND and of allowing the user free choice of the hierarchy of the transmitters whose orders are more subordinate.

To conclude, a sixth embodiment will be described in relation to FIGS. 18 to 21.

In this sixth embodiment, the transmitting point comprises an additional contact C9 and the program contained in the non-volatile memory 16 is provided in order to include in the frame of its signal a code indicating a momentary order when the contact C9 is activated.

The interface 7" of the relay point comprises, in a manner analogous to the transmitting point, an additional contact C8 and the contacts C5, C6 and C7 are provided in order to transmit, starting from the relay point, momentary up, down and stop orders when the contact C8 of the relay point is activated.

The central data memory of the relay point comprises, in addition to the priority 80', address 81', transmitter state 82', and order 83' tables, a type of order table 84 which consists of an identical number of memory slots, each of these slots being associated with a slot of the priority table 80' (FIG. 20). These memory slots are provided in order to store a momentary state when the frame received contains a momentary code or when the relay point transmits a momentary order.

Figure 21:
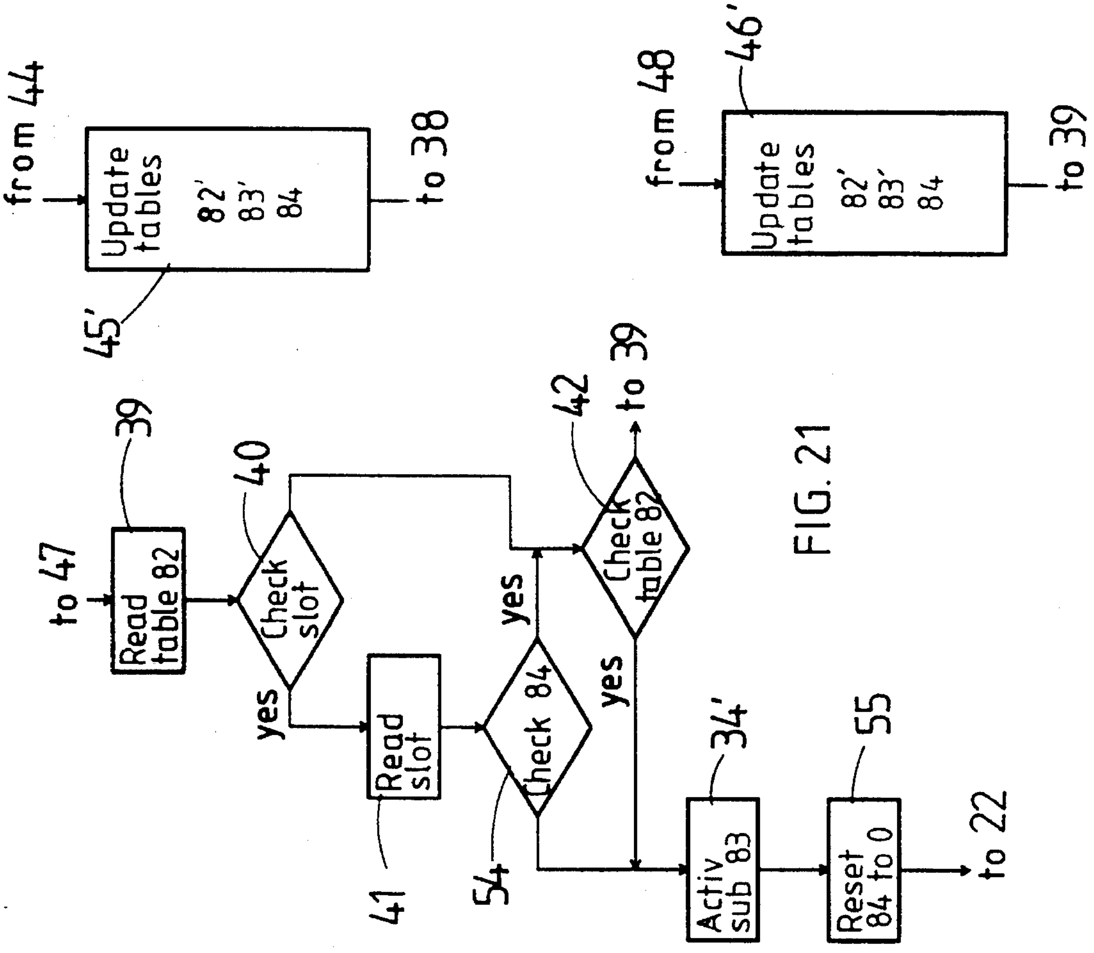
FIG. 21 the modification made to the flow diagram of FIG. 15, in the sixth embodiment.

The flow diagram corresponding to this sixth embodiment is derived from the flow diagram represented in FIG. 14, with the modifications of FIG. 15, modified according to FIG. 21. Instruction 45 of FIG. 14 is replaced by instruction 45' for updating the tables of transmitter states, orders and type of order corresponding to the type and address. Instruction 46 of FIG. 15 is replaced by instruction 46' for updating the tables of states, orders and type of order corresponding to the relay point. The main program comprises an additional instruction 54 for checking the existence of a momentary order code in the type of order table and an additional instruction 55 for resetting the type of order table to 0.

The configuring of the relay point is carried out in the same way as in the preceding modes of execution.

The mode of application differs from the preceding modes at the termination of instruction 41. Instruction 54 checks, in the type of order table, that the order read at 41 is not a momentary order, then instruction 34' executes, in an analogous way to the preceding modes, the subroutine for activating the order read at 41. In the case where instruction 54 verifies the presence of a momentary order, it calls instruction 42 which checks that the pointer is at the end of the table. In this case, instruction 42 calls instruction 34' which activates the subroutine for activating the order read at 41, that is to say the momentary order. If, on the other hand, instruction 42 does not verify the end of the table, it loops back to instruction 39 and the program executes as previously and successively checks all the slots of the state table 82' until it encounters either a permanent order, or the end of the table. In the case where it encounters a permanent order, the latter is then executed immediately, the preceding momentary order then being erased by instruction 55. If it encounters the end of the table, the last momentary order encountered is executed. As long as there exists a permanent active order in the table, the momentary orders are not taken into account.

This embodiment therefore makes it possible to dishierarchize one or more transmitting points or one or more relay points for which the corresponding orders will be taken into account only in the absence of any non-momentary active order.

The possibility of executing a momentary order can likewise be provided in the second, fourth and fifth embodiments.

In the case of the second mode of application, the interface 7 of the relay point comprises the three additional contacts C5, C6 and C7, but not the contact C8, given that the priority table is in the central PRG memory.

In the case of the fifth embodiment, the WIND and URGENT transmitting points have no contact C9 and consequently no possibility of transmitting a momentary order.

In each case, the type of order tables are adapted as a consequence.

I claim:

1. A control system comprising, a plurality of transmitters and a plurality of receivers wherein any one of the transmitters can send a control message to any number of receivers simultaneously and any receiver can receive messages from more than one transmitter, said system further comprising at least two transmitting points (1), each of said transmitting points being assigned a particular identifying code, at least two receiving points (4), said transmitting points and said receiving points being distinct from one another, and relay points (2) equal in number to the number of receiving points, where each relay point is associated with a single receiving point for controlling the associated receiving point, and wherein the output of each of said relay points is connected to the input of its associated receiving point, a common bus line wherein the outputs of said transmitting points and the inputs of the said relay points are each connected to said common BUS line so as to provide one-way communication from the transmitters to the receivers, said common BUS line being the sole path of communication between the transmitters and receivers, the transmitting points being for transmitting signals onto the BUS line, each signal comprising a frame formed of at least one element corresponding to the particular transmitter's identifying code, and of at least one element defining an order to be executed by the receiver, each of said relay points comprising a microprocessor for deciphering and processing the signals transmitted on the BUS line and for activating the receiver which is associated with said relay point, said microprocessor comprising a processing unit, and memories including a programmed non-volatile memory which stores the transmitter identifying codes of each transmitter whose messages the particular receiver can execute, wherein the microprocessor selects among said signals transmitted on the BUS line by the transmitting pint, only those signal in which the transmitter identifying element corresponds to a stored transmitter identifying code, and the programming of the receiver's microprocessor is the sole determinant of the destination and reception of each transmitted signal, wherein the microprocessor causes transmission of the order code of each selected frame to its corresponding receiver, and wherein the microprocessor (5) of the relay point comprises a table of identifying codes which consists of memory slots intended to store the identifying codes of the transmitters to which the relay point is to be responsive, frame memory slots intended to temporarily store the information contained in the frame of the last signal traveling on the BUS line and an indicator consisting of a memory slot and intended to receive a state (0 or 1) each time that the address of the stored frame corresponds to one of those stored in the address table.

2. The installation as claimed in claim 1, wherein each relay point (2) comprises a user interface (7; 7'; 7'') comprising the switch means (C1 to C4; C1 to C2) for introducing, via the user, the said identifying elements into the memory provided for this purpose.

3. The installation as claimed in claim 2, wherein the said user interface (7) comprises a selector (C1) for programming/application mode, a contact (C4) for incrementing the pointer of the code table, two contacts (C2, C3) enabling the incrementing and decrementing of the code of the slot pointed to, and a means (13) of displaying the incrementation/ decrementation of the address.

4. The installation as claimed in claim 1, wherein each transmitting point comprises a code specific to the type of transmitter, the transmitting points being provided in order to incorporate this code in the frame of the transmitted signal, and wherein each relay point (2) comprises, in memory, a priority table (FIG. 7) which consists of several memory slots in which transmitting points codes are stored, according to a particular order, and, in memory, three tables (81, 82, 83) each consisting of an identical number of memory slots, each of these slots being associated with a memory slot of the priority table, the first table (81) being a table of code whose function is to store the addresses of the selected transmitters, the second table (82) being a transmitter state table whose function is to store the active or inactive state of the transmitting points, and the third table (83) being a table of orders whose function is to store the nature of the orders of the selected transmitting points, means for reading and storing the code for the type of transmitter, and instructions for checking that the code for the type of transmitter of the received frame corresponds to a type stored in the priority table.

5. The installation according to claim 4, wherein each relay point (2) comprises a user interface (7) comprising a selector (C1) for programming/application mode, a contact (C4) for incrementing the pointer of the priority table, two contacts (C7, C3) allowing the incrementing and decrementing of the position of addresses in programming mode and a display (FIG. 6) allowing the displaying of the memory slot pointed to in the priority table.

6. The installation as claimed in claim 4, wherein at least one relay point (2) comprises means (C5, C6, C7) for introducing control instructions, wherein the priority table (80') comprises an additional memory slot (801) intended to store the instruction introduced at the relay point, and wherein each of the state (82') and order (83') tables comprises an additional memory slot (821, 831) linked to the said additional memory slot of the priority table, in order to store the active or inactive state and the order of the relay point, the main program of the relay point comprising additional instructions for checking the said means of introduction (C5, C6, C7) and for updating the corresponding slot of the state table and of the order table.

7. The installation as claimed in claim 2, wherein each relay point (2) comprises, in its memory, a priority table (80") consisting of several memory slots, a table of identity codes (81"), a transmitter state table (82") and an order table (83"), these tables each consisting of memory slots each of which is associated with a memory slot of the priority table, the said user interface (7') comprising means for introducing the codes specific to the types of transmitters into the memory slots of the priority table and the corresponding code into the code table.

8. The installation as claimed in claim 7, wherein the said priority table (80'") comprises at least one protected memory slot (812, 813) containing a preprogrammed type code, for checking that the memory slot pointed to in the priority table is protected in order to move the pointer to the corresponding slot of the address table.

9. The installation as claimed in claim 4, wherein at least one transmitting points (1) comprises means (C9) for introducing into the frame of its signal a code for indicating a momentary order and wherein each relay point (2) comprises, in its memory, an additional, type of order table (84) consisting of an equal number of memory slots to the number of memory slots of the other tables (80' to 83'), each of these slots being associated with a slot of the priority table (80'), these slots being provided in order to store a momentary state when the received frame contains a code for indicating a momentary order, the microprocessor comprising additional instructions (54) for checking the existence of a momentary order code in the type of order table and means (55) for resetting the type of order table, as well as instructions (45', 46') for updating the transmitter state, order and type of order tables.

10. The installation as claimed in claim 8, wherein the said means are constituted by a contact (C9).

11. The installation as claimed in claim 9, wherein the user interface (7") comprises an activating contact (C8) and contacts (C5, C6, C7), the activating contact enabling the relay point to transmit momentary orders by means of the said contacts (C5, C6, C7).

12. The installation as claimed in claim 1, comprising sensors linked respectively to each transmitter, wherein each transmitter (1) comprises a power supply (17), a microprocessor (14), an Input interface (18) connecting the sensor to the transmitter and an Output interface (19) connecting the transmitter to the BUS line.

* * * * *

UNITED STATES PATENT AND TRADEMARK OFFICE

CERTIFICATE OF CORRECTION

PATENT NO. : 5,454,077

DATED : September 26, 1995

INVENTOR(S) : Eric Cheron

It is certified that error appears in the above-indentified patent and that said Letters Patent is hereby corrected as shown below:

Col. 16, line 2, after "type code," insert --means--.

Signed and Sealed this

Twentieth Day of February, 1996

Attest:

BRUCE LEHMAN

*Attesting Officer*

*Commissioner of Patents and Trademarks*